US011169031B2

(12) United States Patent
Luo et al.

(10) Patent No.: US 11,169,031 B2
(45) Date of Patent: Nov. 9, 2021

(54) MEASURING DEVICE AND MEASURING METHOD

(71) Applicant: NATIONAL CHIAO TUNG UNIVERSITY, Hsinchu (TW)

(72) Inventors: Chih-Wei Luo, Hsinchu (TW); Yi-Chen Liu, Dongshan Township (TW); Tien-Tien Yeh, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 480 days.

(21) Appl. No.: 16/165,625

(22) Filed: Oct. 19, 2018

(65) Prior Publication Data

US 2019/0360867 A1 Nov. 28, 2019

(30) Foreign Application Priority Data

May 25, 2018 (TW) .................................. 107118023

(51) Int. Cl.
*G01J 11/00* (2006.01)
(52) U.S. Cl.
CPC ..................................... *G01J 11/00* (2013.01)
(58) Field of Classification Search
CPC ................................ G01J 11/00; G10K 15/046
See application file for complete search history.

(56) References Cited

U.S. PATENT DOCUMENTS

| 6,456,380 B1 * | 9/2002 | Naganuma | ............... | G01J 11/00 |
| | | | | 356/450 |
| 2004/0151217 A1 * | 8/2004 | Yeik | ..................... | B23K 26/034 |
| | | | | 372/25 |

FOREIGN PATENT DOCUMENTS

| CN | 105953930 A | 9/2016 |
| CN | 106289544 A | 1/2017 |
| CN | 106989834 A | 7/2017 |
| SU | 762575 A1 * | 12/1992 |
| TW | 302440 B | 4/1997 |

OTHER PUBLICATIONS

English machine translation of Soviet Union patent document SU-762575-A1, by Belyaev et al. (Year: 1992).*
Claude Rullière, "Femtosecond Laser Pulses: Principles and Experiments," 2nd ed. Talence Cedex, France: Springer, 209-213 (2005).
Jung et al., "Non-Invasive Detection of Laser-Induced Breakdown Using Optical Interferometer" Korean Nuclear Society, Taejon (Korea, Republic of); [1 CD-ROM]; 2005; [2 p.]; 2005 spring meeting of the KNS; Jeju (Korea, Republic of): May 26-27, 2005; Available from KNS, Taejon (KR); 5 refs, 5 figs.
Vidal et al., "Modeling the Triggering of Streamers in Air by Ultrashort Laser Pulses" IEEE Transactions on Plasma Science, Apr. 2000, vol. 28, No. 2, pp. 418-433.

* cited by examiner

*Primary Examiner* — Roy Y Yi
*Assistant Examiner* — Geoffrey T Evans
(74) *Attorney, Agent, or Firm* — Birch, Stewart, Kolasch & Birch, LLP

(57) ABSTRACT

An optical pulse measuring method measuring an optical pulse generated from a pulse light source is provided. The method includes: splitting the optical pulse and then focusing them at a measuring point, so as to generate gas plasma by the autocorrelation of the split optical pulses; receiving the sound signal from the gas plasma and generate a plasma sound signal; and using the plasma sound signal to calculate the characteristics of the optical pulse. A measuring device is also provided.

15 Claims, 4 Drawing Sheets

MEASURING DEVICE AND MEASURING METHOD

TECHNICAL FIELD

The present invention relates to a measuring device and measuring method, and in particular, to the measuring device and measuring method of light-induced gas plasma.

BACKGROUND ART

Since the development of laser, high power laser has always been an important subject of development. Comparing to the continuous wave laser, pulsed laser is more capable of providing high pulse energy. In the process of developing pulsed laser, many people would pursue shorter pulse width, which is why autocorrelator that can measure pulse width becomes the key tool to be applied to this technology.

However, the autocorrelator needs to reduce the intensity of the light source when testing and is unable to measure the high-energy laser pulse, or else the nonlinear crystal installed in the autocorrelator will be damaged by the high-energy laser pulse. Moreover, the nonlinear crystal itself is not only quit pricy but also the core component of autocorrelator, thus there will be an extra cost if it is damaged by laser beam during measurements and becomes unable to proceed any further. Therefore, a high-energy laser pulse measuring device and method that can measure the width of the high-energy laser pulse directly are needed.

SUMMARY OF INVENTION

The present invention provides an optical pulse measuring device and method that are capable of measuring the optical characteristics of both low-energy and high-energy laser optical pulse.

An optical measuring method of the present invention can be used to measure a pulsed light source. The method includes:
splitting the optical pulse and then focusing them at a measuring point, so as to generate gas plasma and autocorrelation with the split optical pulses;
receiving sound from the gas plasma and generate a plasma sound signal; and
using the plasma sound signal to calculate the characteristics of the optical pulse.

In an embodiment of the present invention, the plasma sound signal includes a measurement plot which records intensity of the sound along the timeline; and the method calculates the characteristics of the optical pulse with the measurement plot.

In an embodiment of the present invention, the method fits the measurement plot with a fitting curve, and calculating the characteristics of the optical pulse with the fitting curve.

In an embodiment of the present invention, the fitting curve includes:

$\alpha[f_L(t) \times f_R(t)]$ $\alpha$ is a constant which corresponds to the amplitude of the measurement plot;
wherein $$f_L(t) = \begin{cases} -1, t < (a-k_1) \\ 1, t \geq (a+k_1) \end{cases},$$

$k_1$ is constant;
wherein $$f_R(t) = \begin{cases} 1, t < (b-k_2) \\ -1, t \geq (b+k_2) \end{cases},$$

$k_2$ is constant, and the correspondent of the sound signal of the gas plasma in the measurement plot is between $(a-k_1)$ and $(b+k_2)$.

In an embodiment of the present invention, the method calculates the width of the optical pulse on the timeline by measuring width of the fitting curve, wherein the width of the fitting curve is: $(b-a)$.

In an embodiment of the present invention, the function $f_L(t)$ and the function $f_R(t)$ are the Error function, Step function, Heaviside step function, Fermi-Dirac distribution function, Maxwell-Boltzmann distribution, Boltzmann distribution, Sigmoid function, Smooth step function, Generalized logistic function, Richards' curve, Logistic function, Logistic curve, Cumulative distribution function, percent point function, Quantile function, Survival function or Reliability function.

In an embodiment of the present invention, while dispersion is happening when the optical pulse is at the detection point, the fitting curve also includes $-g(t)$, wherein $-g(t)$ is corresponding to the partial plot generated by dispersion in the plasma sound signal plot.

In an embodiment of the present invention, the $g(t)$ is a Gaussian function.

In an embodiment of the present invention, the method uses the width of the measurement plot to calculate the width of the optical pulse on timeline.

In an embodiment of the present invention, when the dispersed optical pulses are at the detection point, the step of calculating the characteristics of the optical pulse according to the measurement plot further includes:
using a dispersion calibrating value and the measurement plot to calculate the characteristics of the optical pulse.

The measuring device of the present invention measures an optical pulse generated from a pulse light source. The device includes:
an optical module, generating autocorrelation of the optical pulse and gas plasma at a measuring point;
sound receiver receiving sound from the gas plasma; and
processor connecting to the sound receiver;
wherein the sound receiver converts the sound of the gas plasma into plasma sound signal, and passes the plasma sound signal to the processor;
the processor calculates the characteristics of the optical pulse according to the plasma sound signal.

In an embodiment of the present invention, the plasma sound signal includes a measurement plot which records the intensity of the sound along the timeline; the processor calculates the optical characteristics of the optical pulse according to the measurement plot.

In an embodiment of the present invention, the processor fits the measurement plot with a fitting curve, and uses the fitting curve to calculate the characteristics of the optical pulse.

In an embodiment of the present invention, the fitting curve includes $\alpha[f_L(t) \times f_R(t)]$, where $\alpha$ is a constant which corresponds to the amplitude of the measurement plot ;
wherein $$f_L(t) = \begin{cases} -1, t < (a - k_1) \\ 1, t \geq (a + k_1) \end{cases},$$

$k_1$ is constant;
wherein $$f_R(t) = \begin{cases} 1, t < (b - k_2) \\ -1, t \geq (b + k_2) \end{cases},$$

$k_2$ is constant, and the correspondent of the sound signal of the gas plasma in the measurement plot is between $(a-k_1)$ and $(b+k_2)$.

In an embodiment of the present invention, the processor uses the width of the fitting curve to calculate the width of the optical pulse on the timeline, and the width of the fitting curve is: $(b-a)$.

In an embodiment of the present invention, the function $f_L(t)$ and the function $f_R(t)$ are the Error function, Step function, Heaviside step function, Fermi-Dirac distribution function, Maxwell-Boltzmann distribution, Boltzmann distribution, Sigmoid function, Smooth step function, Generalized logistic function, Richards' curve, Logistic function, Logistic curve, Cumulative distribution function, percent point function, Quantile function, Survival function or Reliability function.

In an embodiment of the present invention, when the dispersed optical pulse is at the detection point, the fitting curve also includes:
$-g(t)$, where $-g(t)$ is corresponding to the plot generated by dispersion in the plasma sound signal plot.

In an embodiment of the present invention, the $g(t)$ is a Gaussian function.

In an embodiment of the present invention, the optical module includes:
first splitter;
first reflector;
second reflector, wherein the first splitter splits the optical pulse to the first reflector and the second reflector;
second splitter which merges the optical pulses reflected from the first reflector and the second reflector; and
a focusing unit focusing the optical pulse from the second beam splitter on the measurement point and generating gas plasma on the measurement point.

In an embodiment of the present invention, the first splitter and the second splitter are beam splitters, the focusing unit is an off-axis parabolic mirror, and the receiver is a microphone.

In an embodiment of the present invention, soundproofing enclosure provides a soundproofing space; at least the measurement point and the sound receiver is within the soundproofing space.

From the above, the measuring device and measuring method of the invention use the generation of gas plasma to analyze the characteristics of the optical pulses without using extra nonlinear crystals or other measuring media, thus the cost can be cut down and the risks of damaging the components can be avoided.

DESCRIPTION OF EMBODIMENTS

Figure 1:
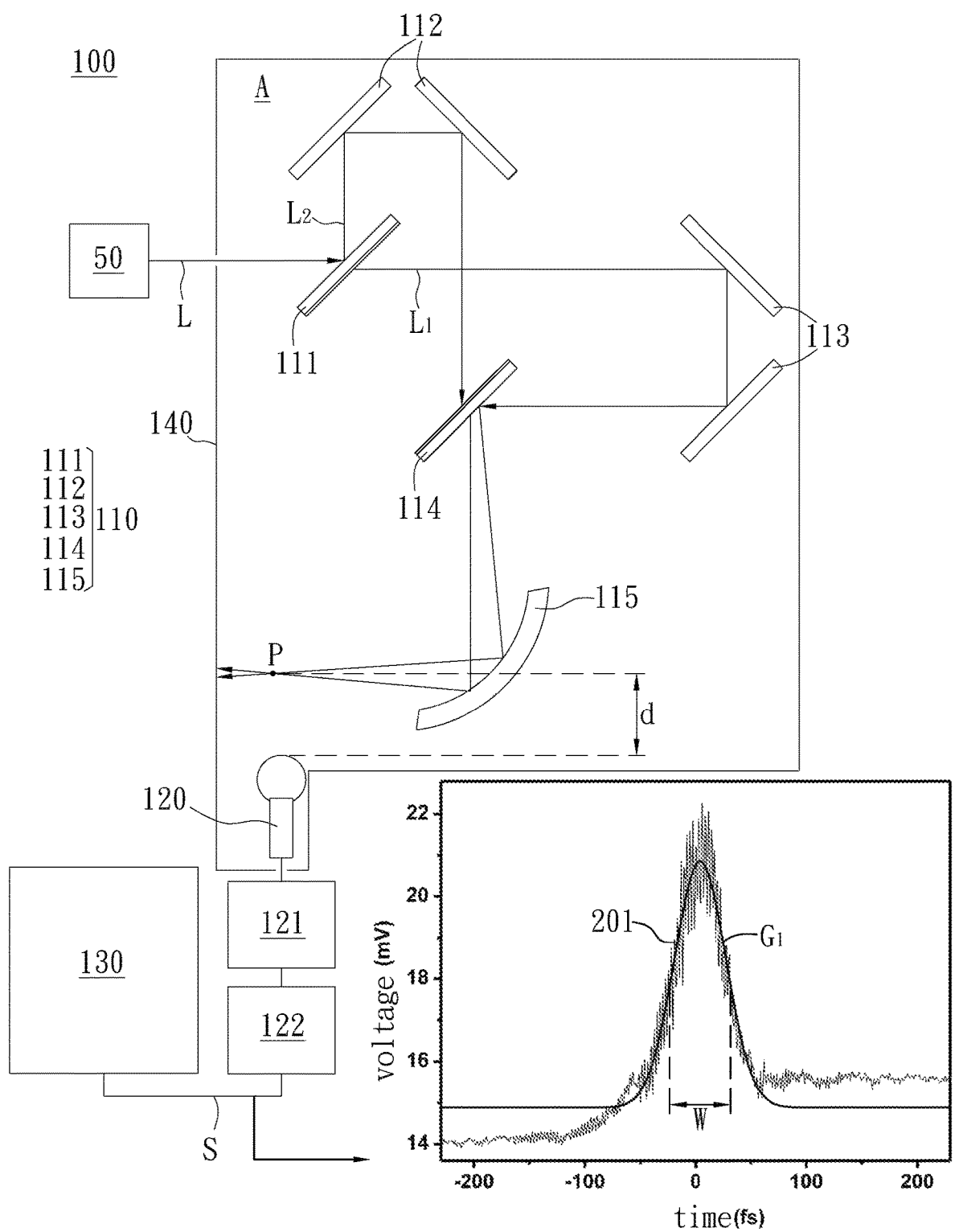
FIG. 1 is a schematic view of the measuring device of the example.

The measuring method and the measuring device of the present invention can be applied to pulsed light source, obtaining the optical characteristics of the optical pulse by measuring the pulsed light sent out from the pulsed light source. The better pulsed light source would be the pulsed laser, such as Femtosecond, $10^{-15}$ sec laser, short-pulse laser generated by using Self mode-locking or high pulse-energy laser generated by using Chirped pulse amplification (CPA).

The peak power density of the pulsed laser can reach to $10^{13}$ to $10^{16}$ W/cm$^2$, and the energy density of the laser pulse is greater than the breakdown threshold of the materials, the materials will melt and evaporate. For instance, the breakdown energy threshold of air is about $4 \times 10^{13}$ W/cm$^2$, and the laser pulse will be able to provide such energy after focusing so as to generate gas plasma.

The following will be referring to the measuring device of the example of the present invention to explain the measuring method of the present invention. Please refer to FIG. 1, the measuring device of the example of the present invention can measure optical pulse L sent out from light source 50, measuring device 100 including optical module 110, receiver 120 and processor 130.

The optical module 110 receives the optical pulse L and focuses it at measuring point P, and then autocorrelator occurs at the measuring point P, and so as the gas plasma is generated. Moreover, the present invention is not limited to the components of optical module; any technical personnel with ordinary skill in the art would be able to replace any suitable component in the optical module 110 to obtain the same effect. Also, the gas plasma generated from the present invention is not limited to the type of gas, the following will take air as an example to elaborate. The following will give an instance to specify the measuring device 100 of the example. The optical module 110 of the example includes first splitter 111, first reflector 112 and second reflector 113. The first splitter 111 will split optical pulse L into $L_1$ and $L_2$, and sending them separately to the first reflector 112 and the second reflector 113. The first splitter 111 such as Beam splitter makes use of partial penetration and partial reflection of the incident beam to split the optical pulse L into $L_1$ and $L_2$ heading two different directions.

The optical module 110 also includes second splitter 114, and the first reflector 112 as well as second reflector 113 such as Retroreflector; wherein the first reflector 112 uses two reflection mirrors to send the optical pulse $L_1$ to the second splitter 114, and the second reflector 113 also uses two reflection mirrors to send the optical pulse $L_2$ to the second splitter 114. The optical pulse $L_1$ and the optical pulse $L_2$ are reflected respectively by the first reflector 112 and the second reflector 113 and are sent to the second splitter 114. The second splitter 114, such as beam splitter similar to the first splitter 111 in opposite direction, can send the optical pulse $L_1$ and the optical pulse $L_2$ to the same optical path by penetration and reflection, and compensate the dispersion of optical pulse $L_1$ at the same time.

Focusing unit 115 of the optical module 110 is used to receive the optical pulses $L_1$ and $L_2$ from the second splitter 114, focusing optical pulse $L_1$ and $L_2$ at the measuring point P. The focusing unit 115 is, for example, an off-axis parabolic mirror or, preferably, a gold-coating off-axis parabolic mirror is preferred, reflects and focuses the optical pulses $L_1$ and $L_2$ by concave surface.

As aforementioned, the example takes air for instance, after the laser pulse is focused, once the energy density of the laser pulse exceeds the breakdown threshold of the air, the gas plasma will be generated in the air. When high-energy laser pulse interacts with the materials, supersonic pulse will be generated on the surface of the materials. The mechanism of generating the sound wave includes electrostriction, thermal expansion, vaporization and optical breakdown. When the laser pulse melts the materials and evaporates the materials to form the plasma, the temperature and pressure of the generated plasma are so high that it expands rapidly. The plasma continues to explode with compressing the air violently and generates shock waves that spreads in supersonic speed, and then soon reduces to general sound wave.

The receiver 120 of the measuring device 100 in the example receives the sound wave of the gas plasma from the measuring point P and converts it into a plasma sound signal S. The receiver 120 such as microphone: a microphone which has a good frequency response for a frequency of 5 kHz is preferred. For instance, the distance between the receiver 120 and the measuring point P in the example is about 15 mm, which helps the receiver 120 to keep the sound receiving from the gas plasma in its acceptable volume range. However, the present invention is not limited to that; in other examples, any personnel with common sense of this field can adjust the measuring distance according to different microphones to obtain plasma sound signal.

The measuring device of the example further includes processor 130. The processor 130 such as Central Processing Unit (CPU), but the present invention is not limited to this type of component. The processor 130 is connected to the receiver 120 and receives plasma sound signal S that corresponds to the sound of gas plasma.

Furthermore, the measuring device 100 of the present invention can be collocated with extra signal processor to provide good plasma sound signal S. For instance, the measuring device 100 further includes Boxcar 121 and Lock-in amplifier 122. The receiver 120 receives the sound and acquires through modulus Boxcar 121, and then sends it to Lock-in amplifier 122 to obtain the plasma sound signal S. However, the present invention is not limited to this; any personnel with common sense of the field can reach the similar sampling effect by other equivalent components.

The processor 130 of the example can calculate the characteristics of the optical pulse L according to the plasma sound signal S. In other words, the measuring device 100 of the example does not need nonlinear crystals to obtain the optical characteristics of the optical pulse such as length on the timeline and etc., so the overall production cost can be further reduced. At the same time, the measuring device 100 can eliminate the material consumption caused by the destruction of the nonlinear crystals due to the excessive intensity of the optical pulse, resulting in incapability of measuring.

Furthermore, the measuring device 100 of the example also includes soundproofing enclosure 140 which provides soundproofing space A for the measuring device 100 so as to avoid external noise affecting the receiver 120. In other examples, the soundproofing enclosure can also be soundproofing container that contains the receiver 120 and the measuring point S in order to make sure that the sound from the gas plasma can be received explicitly by the receiver 120.

The following will further elaborate the measuring device and measuring method of the present invention. However, the measuring device of the present invention is not limited to the following measuring method, any personnel with common sense of this field can make use of the plasma sound signal S to measure any necessary characteristics related to optical pulse according to each one's needs.

Please refer to FIG. 1, the plasma sound pulse S of the example includes measurement plot 201 which corresponds to the sound intensity of the gas plasma along the timeline. Through the sound received by the receiver 120, the measurement plot 201 included in the plasma sound signal S which is obtained by the measuring device 100 can be used to measure the optical characteristics of the optical pulse L, wherein the measurement plot 201 in plasma sound signal corresponds to the sound signal of the gas plasma. For instance, by measuring the width W of the measurement plot 201 on the timeline, the processor 130 can obtain the duration of the optical pulse L so as to complete the measuring of the optical pulse L.

The plasma sound signal S of the example can also make use of fitting of the measurement plot 201 to calculate optical characteristics of the optical pulse L. As presented in FIG. 1, the processor 120 can fit the fitting curve $G_1$ specifically to the measurement plot 201. The fitting curve $G_1$ such as a Gaussian function can be used to calculate a width W by the processor 130. The width W is, for example, full width at half maximum (FWHM) of fitting curve $G_1$; that is, the width W on the timeline is the time difference between two points, where the averages of the minimum to maximum values of the two sides of the measurement plot 201 are located. A time value can be converted by measuring the width W, and because the measurement plot 201 corresponds to duration of air plasma pulse generated from the optical pulse L, the processor 120 can convert the duration of the optical pulse L according to the time value.

In other words, through the fitting curve $G_1$ the measuring device 100 of the example can measure the optical characteristics of the optical pulse L effectively, and, at the same time, avoid the use of consumables such as the nonlinear crystals.

However, the measuring device and the measuring method of the present invention are not limited to the fitting curve, the following will provide other examples to further explain the measuring method as to how to use fitting curve to measure the optical characteristics of the optical pulse.

Figure 2A:
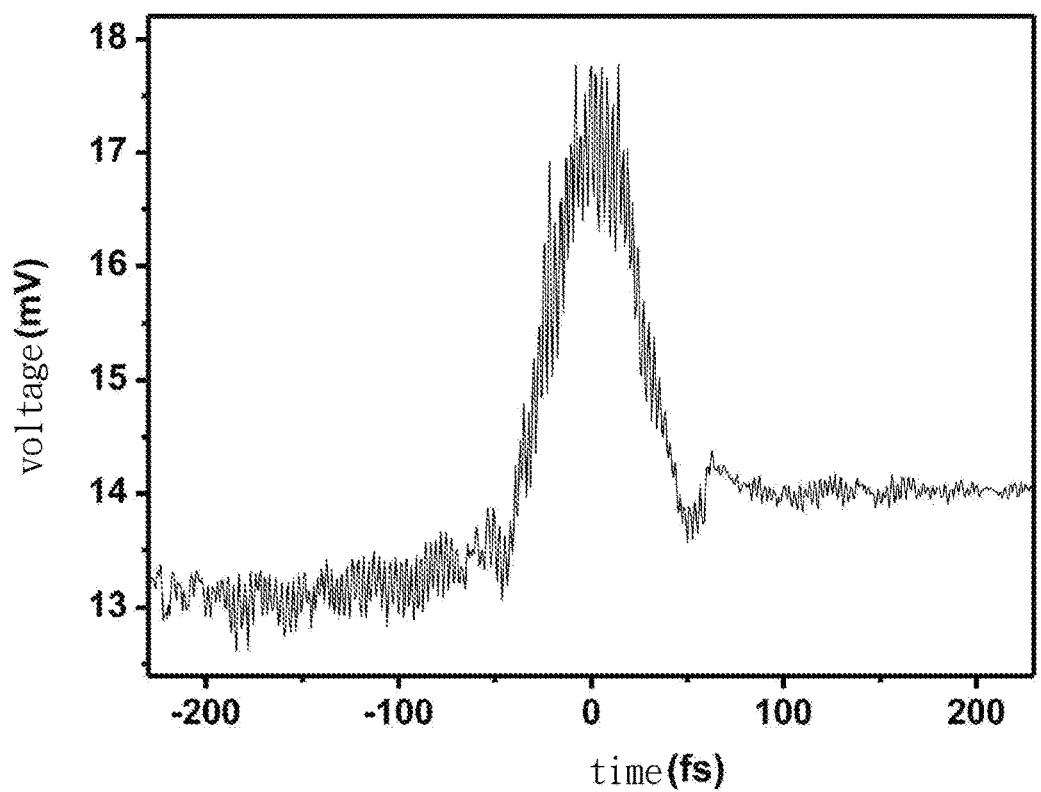
FIG. 2A, 2B are schematic views of the plasma sound signal of the example.
Figure 2B:
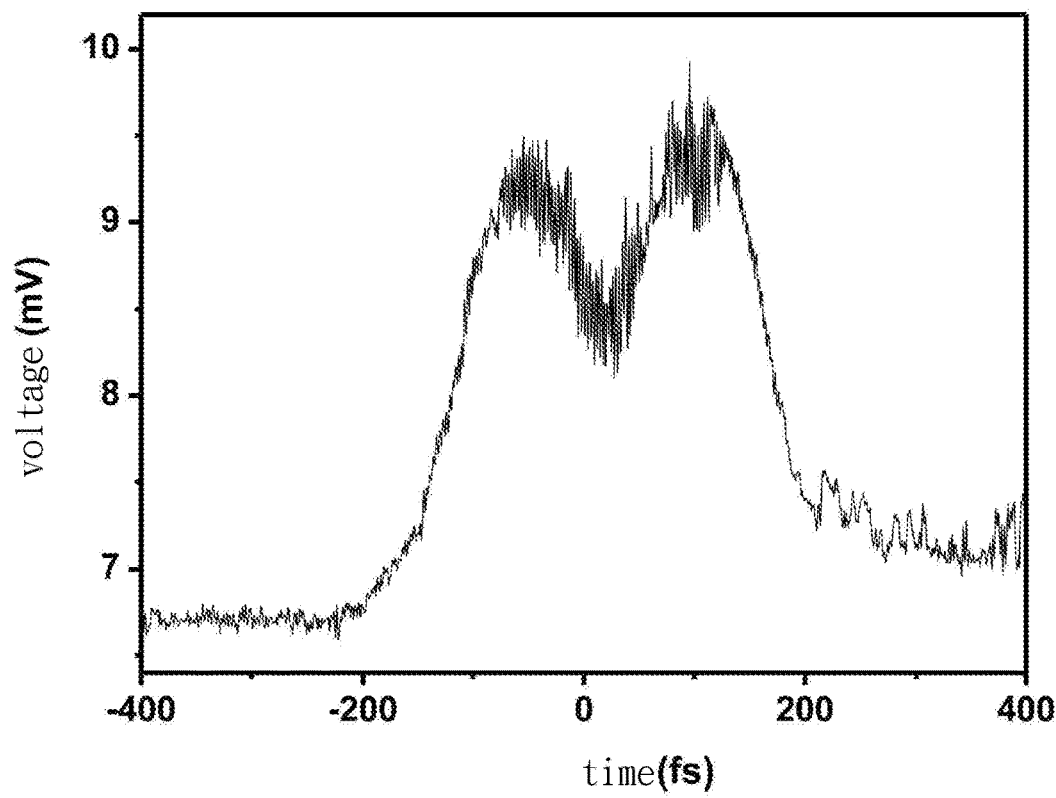

Please refer to FIG. 2A and FIG. 2B: FIG. 2A is the plasma sound signal of another example of the present invention, whereas FIG. 2B is the plasma sound signal of another example of the present invention, wherein the horizontal axis represents time and the voltage of vertical axis is corresponding to the intensity of sound. To explain the following example more explicitly, the measurement plot referred by the following example will be presented directly with fitting curve, wherein FIG. 3A is the fitting curve plot that corresponds to FIG. 2A, and FIG. 3B to 2B, but this does not limit the measuring method and the measuring device of the present invention.

Figure 3A:
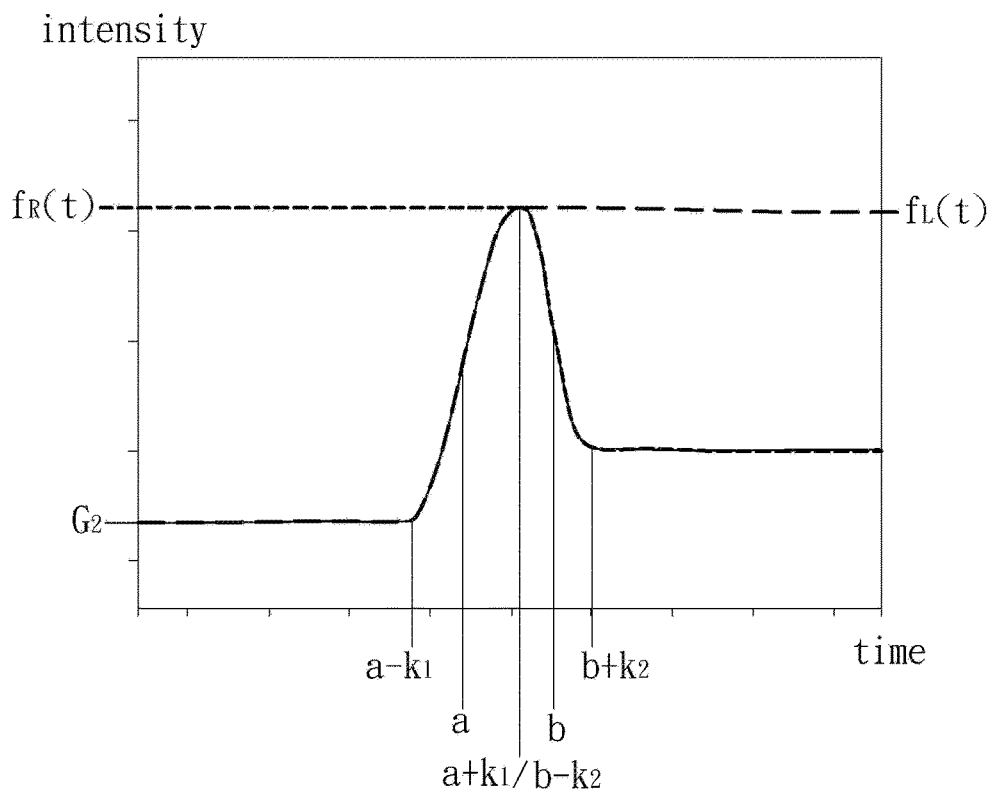
FIG. 3A, 3B are schematic view of the fitting curves of the measurement plots of the example.

Please refer to FIG. 3A, the measurement plot of the plasma sound signal of another example of the present invention can also be fitted by the fitting curve $G_2$, and the fitting curve $G_2$ such as:

$$\alpha[f_L(t) \times f_R(t)]$$

where α is a constant which corresponds to the amplitude of the measurement plot;
wherein $$f_L(t) = \begin{cases} -1, t < (a-k_1) \\ 1, t \geq (a+k_1) \end{cases},$$

$k_1$ is constant;

$$f_R(t) = \begin{cases} 1, t < (b-k_2) \\ -1, t \geq (b+k_2) \end{cases},$$

$k_2$ is constant;
and the correspondent of the sound signal of the gas plasma in the measurement plot is between $(a-k_1)$ and $(b+k_2)$. Specifically speaking, the measurement plot of the plasma sound signal begins to increase at the point of $(a-k_1)$ and the increasing part of the measurement plot is fitted by $f_L(t)$; on the other hand, the measurement plot of the plasma sound signal ends at the point of $(b+k_2)$, and the decreasing part of the measurement plot before the end is fitted by $f_R(t)$. α is used to correspond the maximum amplitude of the measurement plot to allow to fit the complete measurement plot.

For instance, the width of the fitting curve $G_2$ such as (b−a), which is the time interval between the point at which $f_L(t)$ increases to the half of maximum and the point at which $f_R(t)$ decreases to the half of maximum in the fitting curve, can calculate the corresponded duration of the optical pulse of the measurement plot.

On the other hand, $f_L(t)$ such as the Error function is an integral function of Gaussian function, and $f_R(t)$ is the opposite Error function. The fitting curve $G_2$ of the present invention is the figure which uses the Error function to fit the measurement plot in order to analyze the plasma sound signal. However, the present invention is not limited to the types of function; the function which is used to fit the measurement plot can also include: Step function, Heaviside step function, Fermi-Dirac distribution function, Maxwell-Boltzmann distribution, Boltzmann distribution, Sigmoid function, Smooth step function, Generalized logistic function, Richards' curve, Logistic function, Logistic curve, Cumulative distribution function, percent point function, Quantile function, Survival function or Reliability function.

Figure 3B:
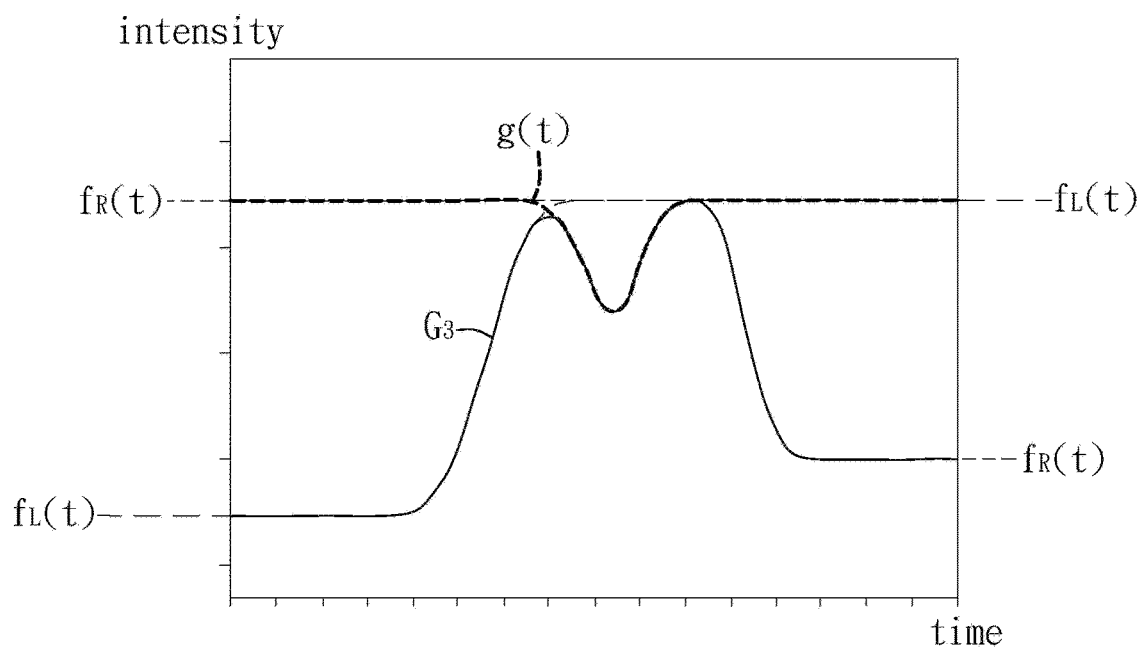

Please refer to FIG. 3B, in another example of the present invention, the measurement plot of the plasma sound signal can also be fitted by other fitting curve, and the fitting curve can be applied to the measurement plot of the optical pulse in the presence of dispersion. After passing through media, the dispersion will cause the broadening of optical pulse. The pulse width of dispersed optical pulse can be expressed as:

$$t_{out} = t_{in}\sqrt{1 + \left(\frac{4 \times \ln 2 \times g \times \beta}{t_{in}^2}\right)^2},$$

where $t_{out}$ is the pulse width after passing through the medium, $t_{in}$ is the pulse width before passing through the medium, g is the Group Delay Dispersion of the transmission medium (the thickness of the transmission medium has been considered), and β is the proportion coefficient (will be explained below) used for correction. The fitting curve is shown in FIG. 3B such as the fitting curve of the gas plasma measurement plot generated by optical pulse when g is 2425 fs.

Please refer to FIG. 3B, when the optical pulse disperses, a pitting feature will be produced in the measurement plot of the plasma sound signal generated by the gas plasma at the measuring point S in the measuring device 100. Therefore, the present invention makes use of fitting curve $G_3$ to fit the measurement plot, the fitting curve $G_3$ includes: $\alpha[f_L(t) \times f_R(t)]-g(t)$, where −g(t) corresponds to the feature generated by dispersion in the plasma sound signal plot, that is, the aforementioned pitting part, so as to completely fit the measurement plot generated by the plasma sound signal. The g(t), for instance, is a Gaussian function and corresponds to the pitting feature, but the present invention is not limited to the types of function.

In the meantime, since the fitting curve specifically fits the two sides of the measurement plot with $f_L(t)$ and $f_R(t)$, the duration of the optical pulse can also be further calculated by measuring the time interval between two functions. One thing at needs to be specified is that functions $f_L(t)$ and $f_R(t)$ represent the same type of fitting functions as the Error function. Different values will be used for correction when fitting different measurement plots, so the functions used might not be the same as the $f_L(t)$ and $f_R(t)$ in the FIG. 3A.

Figure 4:
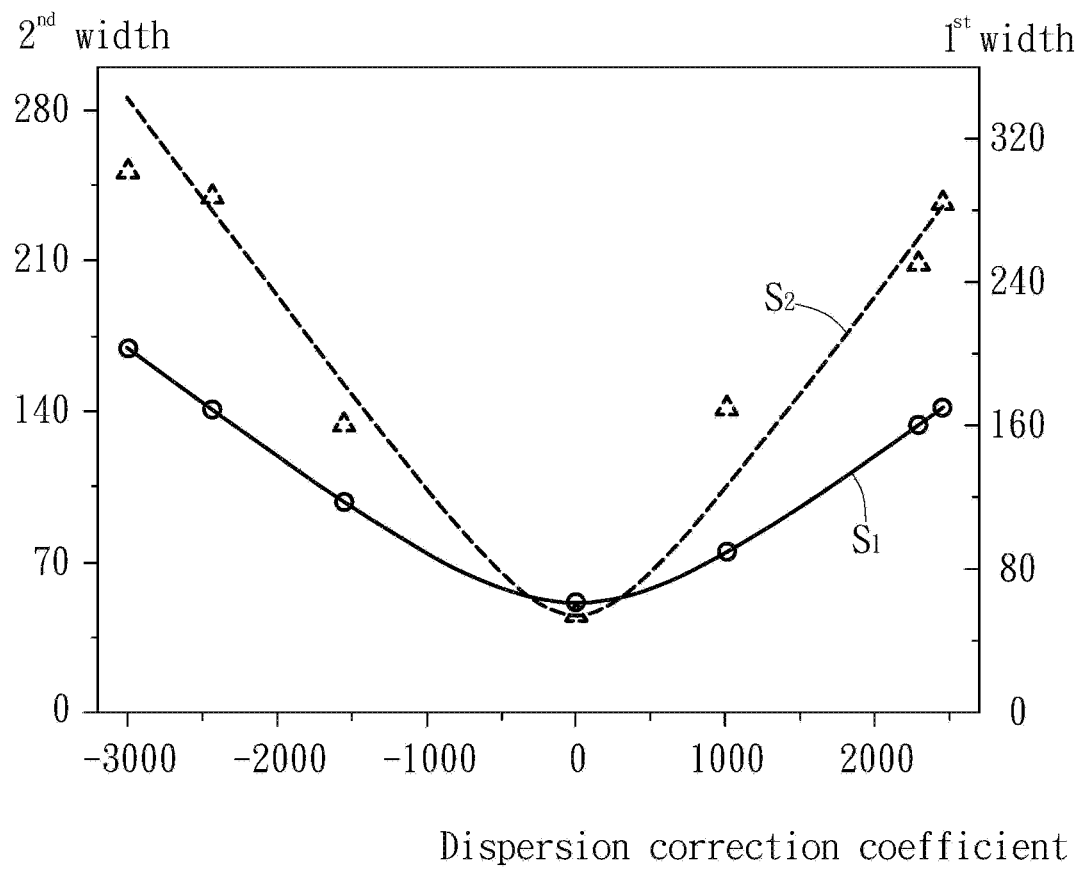
FIG. 4 is a comparison schematic view of measurement result of the nonlinear crystal and measurement result of the measuring method.

Please refer to FIG. 4, which exhibits the pulse width $S_1$ (corresponding to the circle data points in the figure) that is measured by using the known nonlinear crystal as well as, in various dispersion conditions (that is, dispersion correction coefficient corresponding to the related dispersion coefficient g) the values of the pulse width $S_2$ (corresponding to the triangle data points in the figure) that is measured by the measuring method of the measuring device in the example of the present invention, wherein the first width of the vertical coordinate corresponds to the value measured by the measuring method of the measuring device in the example of the present invention, whereas the second width of vertical coordinate corresponds to the pulse width measured by the known nonlinear crystal. From FIG. 3, the pulse width measured by the measuring device in the example of the present invention can all be corresponded linearly to the pulse width measured by the known nonlinear crystal, which means that the measuring device and the measuring method of the present invention can not only measure the width of optical pulse effectively but also make correction according to various dispersion conditions. In other words, from the testing result of FIG. 3, the corresponding dispersion correction value can be calculated under any dispersion condition. For instance, $$t_{out} = t_{in}\sqrt{1 + \left(\frac{4 \times \ln 2 \times g \times \beta}{t_{in}^2}\right)^2},$$

where the correction proportion coefficient β such as 1.84 can correct pulse width $S_2$ to pulse width $S_1$. After the measuring device using such as the fitting curve drawn in FIG. 3B to fit measuring figure and measuring the width, correcting the measured width by dispersion correction value as well as correction proportion coefficient can provide better accuracy.

In conclusion, the measuring device and measuring method of the present invention can measure the characteristics of the optical pulse directly by using the gas plasma generated from the optical pulse in the air, thus the measuring device does not need the expensive nonlinear crystals, and the overall production cost can be significantly reduced. Moreover, by using the measuring method of the present invention, the optical characteristics of the optical pulse can be measured without nonlinear crystals.

The invention claimed is:

1. An optical pulse measuring method, measuring an optical pulse generated from a pulsed light source, including:
splitting the optical pulse and then focusing them at a measuring point, so as to generate gas plasma and autocorrelation with the split optical pulses;
receiving sound from the gas plasma and generate a plasma sound signal; and using the plasma sound signal to calculate the characteristics of the optical pulse;
wherein the plasma sound signal includes a measurement plot which records intensity of the sound along the timeline; and the step of calculating the characteristics of the optical pulse according to the plasma sound signal includes:
calculating the characteristics of the optical pulse according to the measurement plot;
wherein the step of calculating the characteristics of the optical pulse according to the measurement plot includes:
fitting the measurement plot with a fitting curve; and
calculating the characteristics of the optical pulse with the fitting curve;
wherein the fitting curve includes:

$$\alpha[f_L(t) \times f_R(t)],$$

$\alpha$ is a constant which corresponds to the amplitude of the measurement plot;
wherein $$f_L(t) = \begin{cases} -1, & t < (a - k_1) \\ 1, & t \geq (a + k_1) \end{cases},$$

$k_1$ is constant;
wherein $$f_R(t) = \begin{cases} 1, & t < (b - k_2) \\ -1, & t \geq (b + k_2) \end{cases},$$

$k_2$ is constant, and the correspondent of the sound signal of the gas plasma in the measurement plot is between $(a-k_1)$ and $(b+k_2)$.

2. The measuring method of claim 1, wherein the step of calculating the characteristics of the optical pulse according to the fitting curve further includes: calculating the width of the optical pulse on the timeline by measuring width of the fitting curve, wherein the width of the fitting curve is (b−a).

3. The measuring method of claim 1, wherein the function $f_R(t)$ and the function $f_L(t)$ are Error function, Step function, Heaviside step function, Fermi-Dirac distribution function, Maxwell-Boltzmann distribution, Boltzmann distribution, Sigmoid function, Smooth step function, Generalized logistic function, Richards' curve, Logistic function, Logistic curve, Cumulative distribution function, percent point function, Quantile function, Survival function or Reliability function.

4. The measuring method of claim 1, wherein there is dispersion when the optical pulses are at the detection point, the fitting curve also includes: −g(t), wherein −g(t) is corresponding to the partial plot generated by dispersion in the measurement plot.

5. The measuring method of claim 4, wherein the g(t) is a Gaussian function.

6. The measuring method of claim 1, wherein the step of calculating the characteristics of the optical pulse according to the measurement plot includes: using the width of the measurement plot to calculate the width of the optical pulse on timeline.

7. The measuring method of claim 1, wherein there is dispersion when the optical pulses are at the detection point, the step of calculating the characteristics of the optical pulse according to the measurement plot further includes: using a dispersion calibrating value and the measurement plot to calculate the characteristics of the optical pulse.

8. An optical pulse measuring device, measuring an optical pulse generated from a pulsed light source, including:
an optical module, generating autocorrelation of the optical pulses and gas plasma at a measuring point;
sound receiver receiving sound from the gas plasma; and
processor connecting to the sound receiver;
wherein the sound receiver converts the sound of the gas plasma into plasma sound signal, and passes the plasma sound signal to the processor; the processor calculates the characteristics of the optical pulse according to the plasma sound signal;
wherein the plasma sound signal includes a measurement plot which records the intensity of the sound along the timeline; the processor calculates the optical characteristics of the optical pulse according to the measurement plot;
wherein the processor fits the measurement plot with a fitting curve, and using the fitting curve to calculate the characteristics of the optical pulse;
wherein the fitting curve includes $\alpha[f_L(t) \times f_R(t)]$, where $\alpha$ is a constant which corresponds to the amplitude of the measurement plot
wherein $$f_L(t) = \begin{cases} -1, & t < (a - k_1) \\ 1, & t \geq (a + k_2) \end{cases},$$

$k_1$ is constant
wherein $$f_R(t) = \begin{cases} 1, & t < (b - k_2) \\ -1, & t \geq (b + k_2) \end{cases},$$

$k_2$ is constant, and the correspondent of the sound signal of the gas plasma in the measurement plot is between $(a-k_1)$ and $(b+k_2)$.

9. The measuring device of claim 8, wherein the processor uses the width of the fitting curve to calculate the width of the optical pulse on the timeline, and the width of the fitting curve (b−a).

10. The measuring device of claim 8 wherein the function $f_R(t)$ and the function $f_L(t)$ are the Error function, Step function, Heaviside step function, Fermi-Dirac distribution function, Maxwell-Boltzmann distribution, Boltzmann distribution, Sigmoid function, Smooth step function, Generalized logistic function, Richards' curve, Logistic function, Logistic curve, Cumulative distribution function, percent point function, Quantile function, Survival function or Reliability function.

11. The measuring device of claim 8 wherein there is a dispersion when the optical pulses are at the detection point, the fitting curve also includes: $-g(t)$, wherein $-g(t)$ is corresponding to the partial plot generated by dispersion in the measurement plot.

12. The measuring device of claim 11 wherein the $g(t)$ is a Gaussian function.

13. The measuring device of claim 8 wherein the optical module includes:
   first splitter;
   first reflector;
   second reflector, wherein the first splitter splits the optical pulse to the first reflector and the second reflector;
   second splitter which merges the optical pulses reflected from the first reflector and the second reflector; and
   a focusing unit focusing the optical pulse from the second beam splitter on the measurement point and generating gas plasma on the measurement point.

14. The measuring device of claim 13 wherein the first splitter and the second splitter are beam splitters, the focusing unit is an off-axis parabolic mirror, and the receiver is a microphone.

15. The measuring device of claim 8 also includes: a soundproofing enclosure which provides a soundproofing space; at least the measurement point and the sound receiver is within the soundproofing space.

\* \* \* \* \*